Patented Feb. 9, 1932

1,844,430

UNITED STATES PATENT OFFICE

BORIS N. LOUGOVOY, OF MONTCLAIR, NEW JERSEY, ASSIGNOR TO ELLIS-FOSTER COMPANY, OF MONTCLAIR, NEW JERSEY, A CORPORATION OF NEW JERSEY

ENOLIC ACETONE DERIVATIVES AND PROCESS OF MAKING SAME FROM A MIXTURE OF ACETONE AND ITS ENOLIC FORM

No Drawing.  Application filed May 26, 1926.  Serial No. 111,888.

This invention relates to acetone derivatives and to the process of making same, and relates especially to the treatment of a mixture of acetone and its enolic form for the purpose of conversion to higher boiling derivatives, such as, for example, diacetone alcohol, mesityl oxide and other condensation products.

Acetone, when subjected to the action of certain of the alkali metal hydroxides and alkaline earth hydroxides will undergo intramolecular condensation to form diacetone alcohol. Alkali metal hydroxides, such as sodium or potassium hydroxides have been stated by some of the prior workers in the art, to be inferior to alkaline earth hydroxides such as calcium hydroxide by reason of the fact that they cause a resinification of some of the acetone with resultant low yields of diacetone alcohol. I have largely overcome these objectionable effects heretofore attributed to the use of alkali metal hydroxides, by employing very minute amounts of said alkali metal hydroxides, much less than has heretofore been employed. This process has been described in my co-pending patent application Serial No. 96,053.

Without creating any limitation thereby I shall illustrate the invention by the use of such alkali metal hydroxides, it being understood that the employment of other condensing agents is not precluded.

In the preferred illustrative procedure I operate at room temperature, i. e., from 20-30° C., although somewhat lower or higher temperatures may be employed in some cases. The use of high temperatures tends to cause discoloration and resinification and decomposition of the various reaction products and is not therefore very desirable in most cases. Too low temperatures may tend to prolong the reaction unnecessarily and are therefore usually avoided.

Specifically, I find it advisable to use an amount of alkali metal hydroxide ranging from one one-hundredth of one per cent to approximately one-tenth of one per cent by weight of the ketone employed. Proportions within this range are termed "catalytic" since these proportions cause little or no discoloration (resinification) under preferred conditions and merely act as catalysts inducing the condensation of acetone to various higher boiling products. The alkalinity of the reaction mixture in preferred form is so low that it comes within that range commonly expressed in terms of hydrogen ion concentration, that is, it is near the iso-electric point. The alkali metal hydroxide is preferably added in a finely divided condition, alone, or impregnated on some suitable inert carrier, such as asbestos fibre, to the acetone, preferably with agitation, but, in some cases, although not so desirably, may be dissolved in some suitable solvent, such as water, glycerol, glycol, etc., and then admixed with the acetone. It is not necessary that agitation be employed, except initially for a few moments to admix the catalyst and this is of considerable economic advantage.

In carrying out a specific form of my invention I take, acetone, for example, and after carefully neutralizing, I add thereto from one one-hundredth of one per cent to one-tenth of one per cent, by weight, of potassium hydroxide, preferably in a finely-divided condition. Usually I employ only from one one-hundredth to three one-hundredths of one per cent by weight of potassium hydroxide. The exact time required will depend to some extent upon the temperature and the alkali concentration, and ordinarily, will vary from three to twenty-four hours, although, in some cases, with small alkali concentrations, it may take slightly longer. The reaction is preferably conducted at room temperature, that is, between 20 and 30° C. After sufficient time has elapsed for the reaction to reach substantial equilibrium, the alkali is neutralized with an acid, such as hydrochloric, sulfuric, acetic, tartaric, etc. The salt formed may be separated, filtered, centrifuged, or merely allowed to settle out, and the acetone solvent is then suitable for use. This solvent may be used to advantage in some cases without further treatment, or may be fractionally distilled to recover the higher boiling constituents and the uncondensed acetone is then recovered and re-used. Such recovered acetone has properties differing from the virgin acetone as will be subsequently described.

It is within the purview of my invention to so arrange the several operations as to make practically a continuous process of it.

Under these conditions I form a considerable amount of diacetone alcohol, with an equally large amount of liquids boiling between 60 and 150° C., and I note that these products are good nitrocellulose solvents, and also act as solvents for cellulose acetate so that they are of considerable economic value to the industry.

In carrying out my invention I prefer to use a good grade of acetone, substantially free from objectionable impurities including bodies such a methyl acetate reacting with the alkali metal hydroxide, and it should be quite neutral, i. e., substantially at the isoelectric point or having a pH value of approximately 7, since small amounts of acid are sufficient to destroy the extremely small catalytic amounts of alkali employed. An acetone of acid reaction should be first neutralized and then enough alkali may be added to cause condensation.

I may advantageously use acetone which has been derived from isopropyl alcohol by catalytic oxidation or cracking of the alcohol as this yields a very pure grade of acetone and is substantially free from secondary amines which appear to contaminate the acetone and diacetone alcohol obtained from certain other sources. These secondary amines are objectionable in nitrocellulose lacquers since they tend to denitrate nitrocellulose. Acetone derived from the fermentation of corn and from the commercial grades of calcium acetate, and diacetone alcohol from such acetone are usually contaminated with secondary amines which are rather costly to remove.

In the practice of my invention I have found certain peculiarities heretofore unknown and my experiments have, I believe, thrown much light on the basic mechanism of this chemical reaction, with results which not only are applicable to my preferred procedure, but also broadly to the condensation of acetone.

I have found that acetone once treated according to my process and subsequently recovered by fractional distillation is much less reactive when again treated with alkali than is the fresh acetone. My invention contemplates restoring to the used acetone the properties of the fresh or virgin acetone. Some variation in yields of acetone obtained from various sources has also been observed. Under the same conditions of alkali concentration, quantity of acetone employed, temperature variations, and time of reaction, I have obtained quite variable yields of condensation products when recovered acetone is used in comparison with virgin acetone.

For example, a good grade of commercial, substantially pure acetone was treated as follows:—

To 6250 parts by weight, of this acetone I added 1.875 parts of potassium hydroxide, equal to 0.03 per cent. The mixture was agitated for a short time in order to properly admix the catalyst and then allowed to stand and react for a period of 24 hours at room temperature. The alkali was then neutralized with tartaric acid and the product distilled at atmospheric pressure.

The following fractions were collected after the first treatment with potassium hydroxide:

| | | |
|---|---|---|
| 60–70° C | 330 parts by weight or | 5.3 per cent |
| 70–80° C | 200 parts by weight or | 3.2 per cent |
| 80–100° C | 145 parts by weight or | 2.3 per cent |
| 100–120° C | 60 parts by weight or | 0.95 per cent |
| 120–150° C | 137 parts by weight or | 2.2 per cent |
| 150–160° C | 340 parts by weight or | 5.4 per cent |
| 160–170° C | 337 parts by weight or | 5.4 per cent |
| Total | 1549 parts by weight or | 24.75 per cent |

All this material boiled above 60° C., and not higher than 170° C., the material boiling under 60° C., being considered as unreacted acetone and was recovered by distillation and re-used. The yield of acetone which underwent reaction was about 25 per cent, 13 per cent of the converted acetone boiling above 120° C., and 10.8 per cent boiling above 150° C., may be considered as being diacetone alcohol.

The acetone was recovered by distillation and was carefully neutralized so as to have a pH value of 7. The acetone was then treated in identical manner as in the first treatment and in twenty-four hours practically no conversion was obtained, the total yield being less than 1 per cent.

The acetone was distilled from the second treatment and to 4500 parts by weight of this acetone, 0.03 per cent of potassium hydroxide was added and allowed to react in the same manner as before, but over a period of thirty hours instead of but twenty-four. After neutralization with tartaric acid the following fractions were collected:

| | Parts by weight |
|---|---|
| Below 60° C | 3994 |
| 60–70° C | 327 |
| 70–80° C | 9.5 |
| 80–100° C | 42.3 |
| 100–120° C | 24 |
| 120–150° C | 55 |

No higher boiling fractions were obtained. Total converted 457.8 parts.

The total yield of converted actone was about 10.2 per cent and the yield of fractions boiling over 100° C., but 1.8 per cent.

The acetone was recovered in the same manner from the third treatment. This acetone was treated in much the same manner with percentages of potassium hydroxide ranging from 0.1 to 0.05 per cent. Finally 2800 parts by weight of the recovered acetone and previously used acetone was treated with 1.4 parts by weight of potassium hydroxide (equal to 0.05 per cent) and allowed to react for a period of forty-two hours. The acetone was then neutralized with tartaric acid and distilled under normal pressure.

The following fractions were collected:

|  | Parts by weight |
|---|---|
| Un-reacted acetone boiling below 60° C | 1838 |
| Products boiling at 60–70° C | 358 |
| Products boiling at 70–80° C | 93 |
| Products boiling at 80–100° C | 82 |
| Products boiling at 100–120° C | 27 |
| Products boiling at 120–150° C | 31 |
| Products boiling at 150–160° C | 127 |
| Products boiling at 160–170° C | 171 |
| Total converted | 889 |

The total yield of converted acetone was 31 per cent, the yield of fraction boiling above 100° C., was 12.4 per cent. It is thus determined that a re-used acetone, which is considerably less reactive than normal acetone, may be treated successfully according to my process by reacting the material over a longer period of time than is otherwise necessary.

In working already treated acetone, therefore, it is desirable to allow the reaction to take place in a period of time approximately over thirty-six hours and a very careful control of the alkalinity and acidity should be maintained during all operations. The foregoing shows that the products with an intermediate boiling point between acetone and diacetone alcohol may be formed in part at least in the course of the reaction by condensation, and are not necessarily produced by decomposition of diacetone alcohol.

These investigations have shown that the re-used acetone under the same conditions is considerably less reactive than fresh acetone and have also shown that if these less reactive acetones be treated over a longer period of time, that satisfactory yields may finally be obtained. Such conditions would indicate that acetone itself varies in composition. Acetone to some extent will take an enolic form known as iso-acetone and which exists in equilibrium with the ketonic form. The enolic form of acetone is believed to have the structure corresponding to hydroxy propylene, an unsaturated alcohol or unstable nature. Hence in the mechanism of acetone condensation to form other compounds of higher boiling point, the actual material undergoing condensation may be substantially the iso-acetone or enolic acetone. Acetone once treated with alkali to form, for example, diacetone alcohol, will under favorable conditions attain an equilibrium mixture of about ⅞ parts unreacted acetone and ⅛ part of diacetone alcohol. The excess acetone on recovery is, I find, deficient in enolic or iso-acetone and an additional period of time (an induction period), in presence of an enolizer such as an alkali metal hydroxide, is required before condensation will occur with formation of important amounts of the higher boiling liquids. Accordingly it will be seen that the time of reaction under given conditions such as temperature and alkali concentration will vary with the enolic content of the acetone employed. It is therefore apparent that no definite time factor may be said to be equally applicable to all acetone and this factor must be adjusted according to the peculiar characteristics of the material employed.

To recapitulate, my invention comprises the treatment of acetone with an alkaline substance capable of causing condensation forming a certain proportion of products of higher boiling point, such alkaline condensing agent being, for example, quick lime, calcium hydroxide, barium hydroxide, and similar alkaline earth metal hydroxides and the like, insoluble in the acetone, or with sodium and potassium hydroxides, these two hydroxides preferably used in minute amount, and preferably in such proportions as will dissolve completely in the acetone. The acetone exposed to a condensing agent of this character, or mixtures of such condensing agents, is permitted to undergo reaction and condensation, preferably at about room temperature, over a period sufficient to bring about a substantial equilibrium between the higher boiling solvents formed and the unchanged acetone. Ordinarily, this is indicated by the formation of say, 12 to 15 per cent of diacetone alcohol. The acetone mixture then preferably is neutralized and subjected to distillation. This may be carried out at ordinary pressure or in a vacuum. Usually it is desirable to avoid acid reaction during distillation and therefore a condition of neutrality approximating the iso-electric point is secured prior to such neutralization when the process is carried out under preferred conditions. It is possible also to utilize in the arts a solvent mixture containing a catalytic proportion of potassium or sodium hydroxide for purposes where slight alkalinity of the solvent is not objectionable. Various organic and inorganic acids may be utilized for neutralization and the employment of gases containing carbon dioxide to form the carbonate or bicarbonate likewise is not precluded. Substances producing insoluble alkali metal compounds are usually preferable. In any event, the acetone recovered from the operation has qualities different from the fresh or virgin acetone. If treated immediately with alkaline condensing agents a very poor high boiling solvent results. If the recovered acetone is allowed to stand advantageously in contact with the alkaline condensing agent which is being used, it will be found that after standing in this manner for a period considerably longer than that required in the case of the virgin acetone, yields of high boiling solvents may be obtained which approximate those obtained from the virgin acetone. This surprising observation is explained on the basis that enolized acetone is the reactive substance and a period of time sufficient for enolization to progress to a substantial extent, preferably to equilibrium, is required for best results. My invention, therefore, takes cognizance of the dissimilarity of recovered acetone and virgin acetone; and involves the step of permitting the acetone to regain substantially its former content of enols through standing for a sufficient period of time, preferably in contact with an alkaline condensing agent. By the term "recovered acetone" as used herein, I means acetone which has been once or several times treated with alkaline condensing agents, neutralized and separated from higher boiling reaction products after such treatment, and I use this term to distinguish from fresh or virgin acetone. My invention, therefore, in its preferred and simple form, is concerned with the step of subjecting recovered acetone under conditions which permit of recovery of enolic equilibrium, such stage of reaction preferably being conducted in the presence of an alkaline condensing agent. Recognition of the importance of the time factor in treating recovered acetone and the adjustment of time in a predetermined manner to obtain enhanced enolization, therefore constitute features of the present invention.

In using recovered acetone repeatedly, it shrinks in volume due to the removal of the higher boiling solvents which are formed. To the recovered acetone, there may be added, if desired, a quantity of fresh or virgin acetone sufficient to restore the original volume. Such a mixture may be treated with the alkaline condensing agent or mixture of alkaline agents as indicated above. Since the formation of higher boiling solvents takes place more rapidly in the virgin acetone, conditions applicable to the production of good yields from both the virgin acetone and the recovered acetone in the mixture may not obtain, it is desirable in many cases to carry out the treatment of the virgin acetone as a separate step and to combine the residues of recovered acetone arising from the treatment of different batches, thus maintaining the volume of material desirably uniform, while at the same time treating in one operation solely recovered acetone on the one hand and virgin acetone on the other hand.

Finally it should be noted that there is involved the cyclic process of treating acetone with condensing agents to obtain solvents of higher boiling point, with the recovery of unconverted and largely de-enolized acetone, including the step of enolizing the recovered acetone to render it approximately as active as virgin acetone in forming liquids of higher boiling point on contact with an alkaline condensing agent; such agent, for example, being incorporated with recovered acetone and the mixture allowed to stand for a period longer than that required for virgin acetone to yield approximately the same proportion of liquids of higher boiling point.

What I claim is:—

1. In the cyclic process of treating acetone with condensing agents to obtain solvents of higher boiling point and with recovery of the unconverted acetone, the improvement which comprises enolizing recovered acetone to render it active in forming liquids of higher boiling points by treating same with an alkaline condensing agent, for a time longer than was necessary in the first treatment with condensing agent, to convert a substantial fraction of said acetone into products with higher boiling points.

2. In the cyclic process of treating acetone with condensing agents to obtain solvents of higher boiling point with recovery of unconverted acetone, the step which comprises incorporating an alkaline condensing agent with recovered acetone and allowing the mixture to stand for a period longer than that required for virgin acetone to yield approximately the same proportion of liquids of higher boiling point.

3. In the cyclic process of treating acetone with condensing agents to obtain solvents of higher boiling point and with recovery of the unconverted acetone, the improvement which comprises enolizing recovered acetone to render it active in forming liquids of higher boiling points which comprises subjecting said recovered acetone to contact with an alkaline condensing agent for a period substantially longer than was used in the first condensation treatment.

4. A process which comprises treating acetone with an alkaline condensing agent for at least 3 to 24 hours, and fractionally distilling in the absence of alkalies, again subjecting the non-converted acetone from such first stage, to treatment with an alkaline condensing agent for a period substantially greater than the time of treatment in the first stage.

5. In the production of condensation products of acetone, first treating acetone with a few hundredths of a percent of an alkali metal hydroxide, allowing the mixture to stand for not substantially less than 3 hours, neutralizing, distilling off unconverted acetone, adding to the latter a few hundredths of a percent of an alkali metal hydroxide, allowing to stand for a considerably longer period than was necessary in the first alkaline treatment until a substantial amount of the acetone has been converted, neutralizing and distilling off unconverted acetone, and repeating the cycle of operations.

6. In the cyclic process of treating acetone with condensing agents to obtain solvents of higher boiling point with recovery of unconverted acetone, the step which comprises incorporating an alkaline condensing agent with recovered acetone and allowing the mixture to stand for a period longer than that required for virgin acetone to yield a substantial proportion of liquids of higher boiling point.

7. A process of forming condensation products from acetone and similar aliphatic ketones which comprises adding an alkaline condensing agent, equivalent to the addition of about 0.02 to 0.03% of KOH and allowing to stand for about 24 hours at ordinary room temperature, neutralizing the alkali, separating the condensation products and the unconverted material from each other by distillation and treating the latter with an alkaline condensing agent under more powerful condensing conditions than were used in the first condensing operation, and repeating the cycle of operations, substantially as described.

BORIS N. LOUGOVOY.